(12) United States Patent
Hacskaylo

(10) Patent No.: US 6,328,449 B1
(45) Date of Patent: Dec. 11, 2001

(54) BREWSTER-ANGLE DISPERSION FILTER (U)

(75) Inventor: Michael Hacskaylo, Falls Church, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 06/623,287

(22) Filed: May 3, 1984

(51) Int. Cl.⁷ ....................................................... G01C 3/08
(52) U.S. Cl. .......................... 359/601; 359/498; 359/501; 359/502
(58) Field of Search ........................... 332/7.51; 356/327, 356/370, 432, 5.14; 455/602, 616; 372/20, 28, 32; 350/372, 381, 383, 404, 407, 311, 397, 401, 405; 359/498, 501, 601

(56) References Cited

U.S. PATENT DOCUMENTS

| | | | | |
|---|---|---|---|---|
| 2,726,173 | * | 12/1955 | Martin | 250/225 |
| 3,439,968 | * | 4/1969 | Hansen et al. | 350/394 |
| 3,765,746 | * | 10/1973 | Ashley et al. | 350/394 |
| 3,792,916 | * | 2/1974 | Sarna | 350/316 |
| 3,934,210 | * | 1/1976 | Yarborough et al. | 350/404 |
| 3,969,573 | * | 7/1976 | Barrhuise et al. | 350/401 |
| 4,184,767 | * | 1/1980 | Hughes et al. | 356/152 |
| 4,311,384 | * | 1/1982 | Keene | 356/5 |
| 4,403,190 | * | 9/1983 | Greenwood | 324/304 |
| 4,406,520 | * | 9/1983 | Sato | 350/394 |
| 4,504,123 | * | 3/1985 | Smith | 350/394 |
| 4,530,600 | * | 7/1985 | Lopez | 350/407 |
| 4,545,651 | * | 10/1985 | Kato et al. | 350/394 |

FOREIGN PATENT DOCUMENTS

| | | | | |
|---|---|---|---|---|
| 2725107 | * | 12/1978 | (DE) | 350/311 |
| 0963348 | * | 7/1950 | (FR) | 350/404 |
| 0319869 | * | 10/1929 | (GB) | 350/152 |

OTHER PUBLICATIONS

Partington, "An Advanced Treatise on Physical Chemistry", 1953, pp 104–107, vol. 4, Langmans, Greene & Co., N.Y.*
Brewster, "Treatise on Optics",1853, pp 220–223, Published in London England by Langman et al.*
Makas et al, "New Arrangement of . . . Lufrared," pp 998–9, Opt. Soc. Am., vol. 45, 1955.*
Bagomalov et al, "An Infrared Radiation Polarizer," 6/73, pp 982, Instrum. Exp. Tech (USA), vol. 16, #3, Pt 2.*
Driscoll et al, "Handbook of Optics", 1978, pp 7–13, Opt. Soc. of America, McGraw–Hill Book Co.*
Sears, "Optics", 1949, pp 174–177, Addison–Wesley Pub., Co., Inc.*
Vinograpova, "Multicomponent Dispersive . . . Filters", 8/70, Opt. & Spectrosc., vol. 29, #2, pp 209–11, 350/311.*
Jenkins et al, "Fundamentals of Optics", 1976, pp 498–499, 524, 525, McGraw–Hill Book Co.*

* cited by examiner

Primary Examiner—Nelson Moskowitz
(74) Attorney, Agent, or Firm—Anthony T. Lane; Milton W. Lee; Aubrey J. Dunn

(57) ABSTRACT

A particular wavelength may be eliminated from the spectrum of a randomly polarized thermally radiative scene by a quarter-wave polarizer and a dielectric dispersive mirror angularly positioned at the Brewster angle for the particular wavelength. The scene radiation is linearly polarized in the plane of incidence of the mirror and the particular wavelength of the scene is transmitted. The other wavelengths of the scene whose indices of refraction are dispersive, i.e., different from the particular wavelength, are reflected and directed to a photodetector, some other radiative detecting device, or a human eye. The invention can thus provide protection from a laser or other high-power optical emitter when used as a counter-measure in a thermally radiative scene.

4 Claims, 2 Drawing Sheets

BREWSTER-ANGLE DISPERSION FILTER
(U)

The invention described herein may be manufactured, used, and licensed by the U.S. Government for governmental purposes without the payment of any royalties thereon.

BACKGROUND OF THE INVENTION

This invention is in the field of spectral filters, and is particularly concerned with the infrared spectrum. Such filters include three basic types: (1) absorption, using the light-absorbing properties of matter, (2) Fabry-Perot, which take advantage of the electromagnetic wave interference phenornona, and (3) birefringent, utilizing acousto-optical and electro-optical properties of materials. These filters can be designed to transmit, absorb, and reflect (and combinations of these) particular spectral bands or wavelengths. Although the filters can be theoretically designed to absorb or reflect 100% of particular wavelengths or bands of radiation, their absorption or reflectance in practice is less than 100%. Normally this is not important, unless one is using such a filter to protect a sensitive infrared detector from high-intensity radiation. In this case, 100% radiation blockage (absorption) or diversion (reflection) may be required. The instant invention is able to provide 100% elimination of the unwanted radiation of a particular wavelength from a thermally radiative scene.

SUMMARY OF THE INVENTION

This invention is an optical system which acts as a dispersion filter; the system consists of a quarter-wave birefringent polarizer and a dielectric dispersive mirror on an optical path. The polarizer is designed for some particular wavelength of interest in a spectrum, and the mirror is inclined to the optical path such that the Brewster angle for the particular wavelength is in the plane of incidence. The radiation of the particular wavelength is transmitted by the mirror, and the other wavelengths are reflected by the mirror. The reflected wavelengths are directed to a photodetector or to other optical devices.

DESCRIPTION OF PREFERRED EMBODIMENT

This invention takes advantage of Brewster's angle and other phenomenon for eliminating a particular wavelength or waveband of radiation from an infrared spectrum. Brewster observed (in 1815) that when ordinary light is incident at some particular angle on a dielectric, the reflected light is plane polarized in the perpendicular mode (Pe) and that the transmitted light is plane polarized in the parallel mode (Pa). The angle of incidence ($\theta_i$) is related to the index of refraction (n) of the dielectric by the simple relation: $\theta_B = \tan^{-1} n$, wherein $\theta_B$ is the particular angle of incidence and is known as the Brewster angle.

Figure 1:
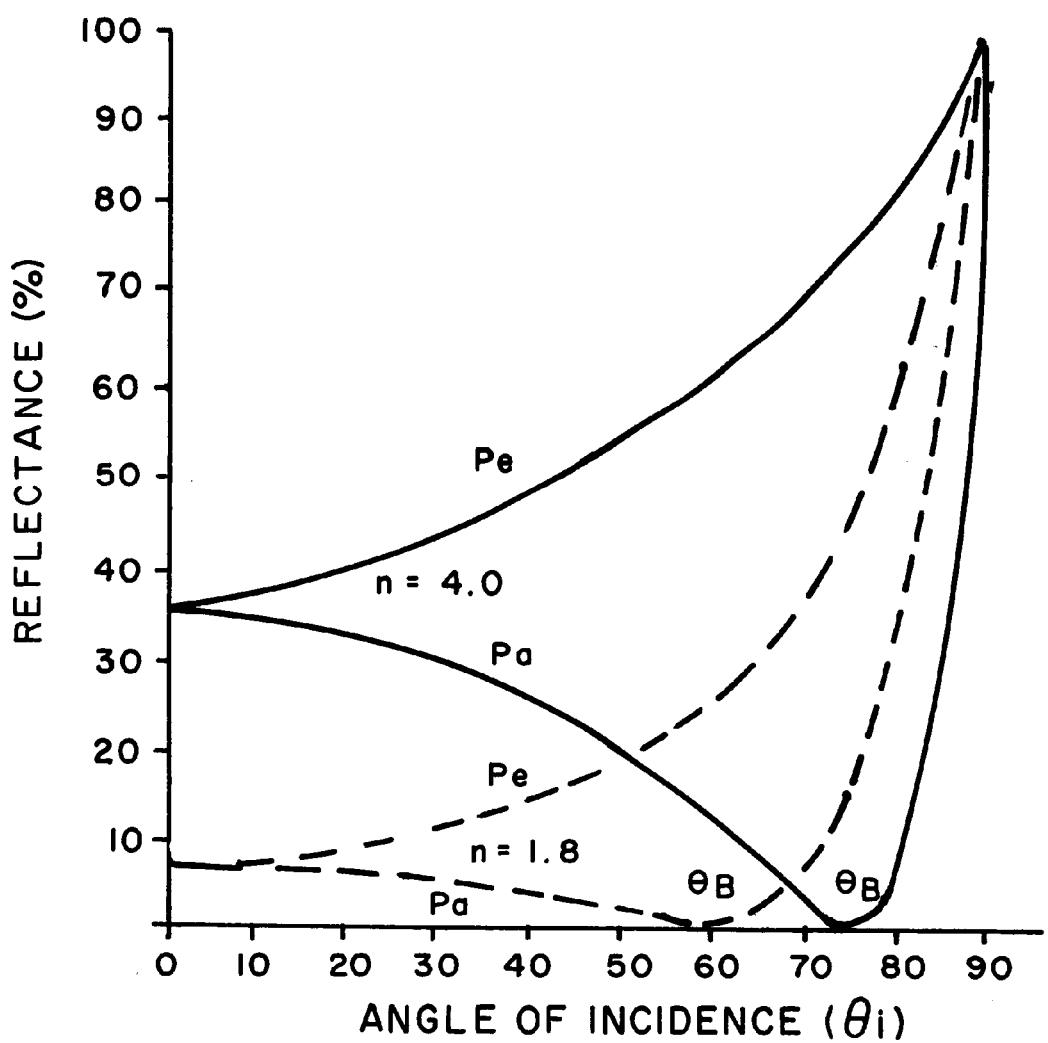
FIG. 1 shows curves of reflectance vs. angle of incidence for two distinctly different reflectors.

FIG. 1 shows curves for reflectance of both Pe and Pa components of 10.6 $\mu$m radiation, for two different materials. One of the materials is PbS with n=1.8 and the other is Ge, with n=4.0. As can be seen on these curves, the percentage of reflection of the radiation is related to angle of incidence. For n=4.0 . (solid line curves), the reflectance of Pe increases in a quasi-parabolic manner to 100% at $\theta_i=90°$. The reflectance of Pa, however, decreases to zero at $\theta_i=\tan^{-1} n$, i.e., at the Brewster angle $\theta_B$ (75.96°), then rapidly increases to 100% at $\theta_i=90°$. For these particular materials, n is strongly related to wavelength, i.e., the materials have a high dispersion. $\theta_B$ is also related to the wavelength as one might expect.

The other phenomenon is the changing of randomly polarized light to linearly polarized light as performed by a quarter-wave birefringent plate. The quarter-wave plate also rotates the direction of the linearly polarized light.

These phenomena allow the invention to operate, as will be explained below.

Figure 2:
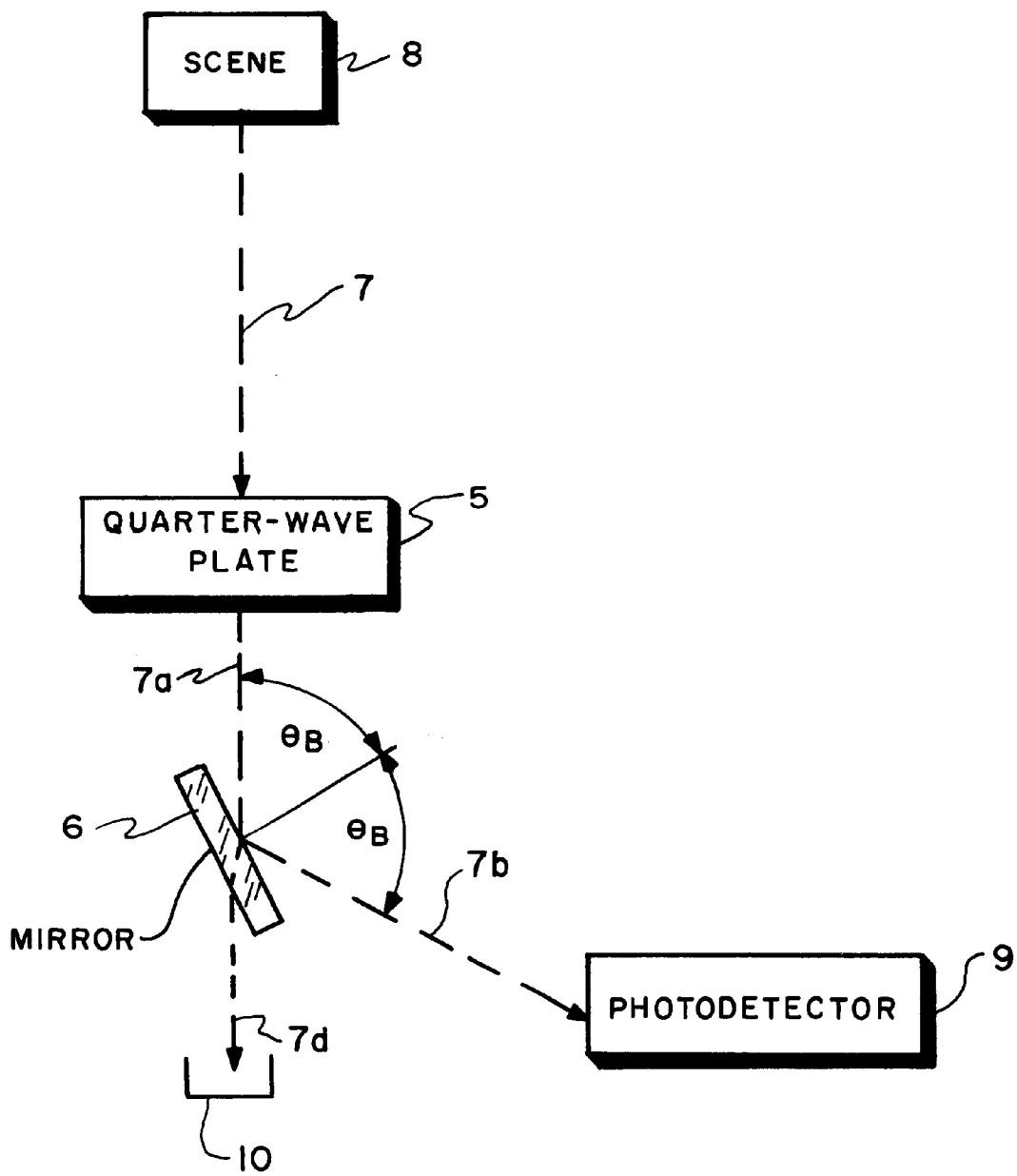
FIG. 2 is a schematic showing of the invention.

Referring now to FIG. 2, the preferred embodiment of the invention is shown, and includes a quarter-wave plate 5 and a flat dielectric dispersive mirror 6. Randomly polarized radiation shown as ray 7 from scene 8 passes through plate 5. The linearly polarized radiation shown as ray 7a is incident upon the mirror 6 at the Brewster angle $\theta_B$ which was selected for transmission of the unwanted radiation of some particular wavelength shown as ray 7d. This radiation may be absorbed in a light trap (10). The remaining thermally radiative scene is reflected by the mirror 6 and is shown as ray 7b. Ray 7b is directed onto photodetector 9, or other infrared detecting devices.

This invention is particularly concerned with preventing damage to a human eye or to a photodetector observing an infrared scene, which might include a source of high-power illumination, such as a laser. Specifically, a possible laser threat is the $CO_2$ laser operating at a wavelength of 10.6 microns. This laser, if of sufficient power, can destroy the sight of a human eye or of a sensitive photodetector. In order to eliminate this 10.6 micron wavelength, one may have ray 7a impinge on a mirror 6 of germanium at 75.96°. The quarter-wave plate 5 may be formed of cadmium selenide.

Although they have not been specifically shown, it should be understood that detector 9 may be a thermal imaging system, focal plane array, or any of several other types of infrared sensing systems.

I claim:

1. A system for protecting a sensitive photodetector from a particular radiation wavelength in a radiation spectrum by eliminating said radiation wavelength from said spectrum, including:

a polarizer for linearly polarizing at least said particular wavelength in said spectrum to a predetermined linear polarization;

and a mirror which transmits at least the linearly polarized particular wavelength in said spectrum and reflects substantially the remainder of said spectrum to said photodetector.

2. The system as set forth in claim 1 wherein said mirror is a Brewsterangle reflector, and the spectrum is directed onto the reflector at the Brewsterangle for said particular radiation wavelength, and with the linearly polarized radiation in the plane of incidence of the mirror.

3. The system as set forth in claim 1, wherein said polarizer is a quarter-wave plate for said particular radiation wavelength, that changes randomly polarized radiation of at least said radiation wavelength to linearly polarized radiation.

4. The system as set forth in claim 2, wherein said polarizer is a quarter-wave plate for said particular radiation wavelength, that changes randomly polarized radiation of at least said radiation wavelength to linearly polarized radiation.

* * * * *